United States Patent
Hsiao et al.

(10) Patent No.: US 9,588,507 B2
(45) Date of Patent: Mar. 7, 2017

(54) LOW-POWER MECHANISM FOR WEARABLE CONTROLLER AND ASSOCIATED CONTROL METHOD

(71) Applicant: MediaTek Inc., Hsin-Chu (TW)

(72) Inventors: Chih-Hsiang Hsiao, Taipei (TW); Li-Chun Tu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 416 days.

(21) Appl. No.: 14/225,478

(22) Filed: Mar. 26, 2014

(65) Prior Publication Data

US 2015/0277401 A1 Oct. 1, 2015

(51) Int. Cl.
*G06F 1/00* (2006.01)
*G05B 15/02* (2006.01)

(52) U.S. Cl.
CPC ..................... *G05B 15/02* (2013.01)

(58) Field of Classification Search
None
See application file for complete search history.

(56) References Cited

U.S. PATENT DOCUMENTS

| | | | | |
|---|---|---|---|---|
| 2006/0069928 A1* | 3/2006 | Winick | ............. | G06F 1/305 713/300 |
| 2009/0239591 A1* | 9/2009 | Alameh | ............. | H04M 1/05 455/574 |
| 2011/0022025 A1* | 1/2011 | Savoie | ............. | A61M 5/14248 604/500 |
| 2012/0316471 A1* | 12/2012 | Rahman | ............. | G06F 1/3296 600/595 |
| 2013/0053992 A1* | 2/2013 | Higuchi | ............. | G09G 5/008 700/94 |
| 2013/0124891 A1* | 5/2013 | Donaldson | ............. | G06F 1/163 713/322 |
| 2014/0244009 A1* | 8/2014 | Mestas | ............. | A63B 24/0062 700/91 |
| 2015/0148923 A1* | 5/2015 | Grimme | ............. | G06F 3/01 700/83 |
| 2015/0227180 A1* | 8/2015 | Rabii | ............. | G06F 1/26 713/323 |
| 2015/0248833 A1* | 9/2015 | Arne | ............. | G01D 21/00 340/870.07 |

* cited by examiner

*Primary Examiner* — Adam Lee
(74) *Attorney, Agent, or Firm* — McClure, Qualey & Rodack, LLP

(57) ABSTRACT

A low-power wearable controller and associated control method are provided. The wearable controller includes: a processing unit; a memory unit; a peripheral interface unit including a plurality of peripheral interfaces; and a control module, coupled to the processing unit, the memory unit and the peripheral interface unit, wherein the control module is enabled when the wearable controller is operated in a first operation mode, and the control module is disabled when the wearable controller is operated in a second operation mode.

23 Claims, 4 Drawing Sheets

LOW-POWER MECHANISM FOR WEARABLE CONTROLLER AND ASSOCIATED CONTROL METHOD

BACKGROUND OF THE INVENTION

Field of the Invention

The invention relates to a wearable controller, and in particular to a low-power wearable controller and associated control method.

Description of the Related Art

Wearable devices, such as watches or other wrist-worn devices, are by their nature relatively small in size, and may be less than 40 mm in diameter. A wearable electronic device with multiple functions such as display, email, text messaging, and wireless communication requires intelligent interaction with a user to input data, scroll through software menus, etc. Due to the limited battery capacity of the wearable device, it is a big challenge to reduce the power consumption of the wearable device.

BRIEF SUMMARY OF THE INVENTION

A detailed description is given in the following embodiments with reference to the accompanying drawings.

A wearable controller is provided. The wearable controller comprises: a processing unit; a memory unit; a peripheral interface unit comprising a plurality of peripheral interfaces; and a control module, coupled to the processing unit, the peripheral interface unit and the memory unit, wherein the control module is enabled when the wearable controller is operated in a first operation mode, and the control module is disabled when the wearable controller is operated in a second operation mode.

A method for operating a wearable controller is provided. The wearable controller comprises a processing unit, a memory unit, a control module, and a peripheral interface unit, and the control module is coupled to the processing unit, the memory unit and the peripheral interface unit. The method comprises the steps of: enabling the control module when the wearable controller is operated in a first operation mode; and disabling the control module when the wearable controller is operated in a second operation mode.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
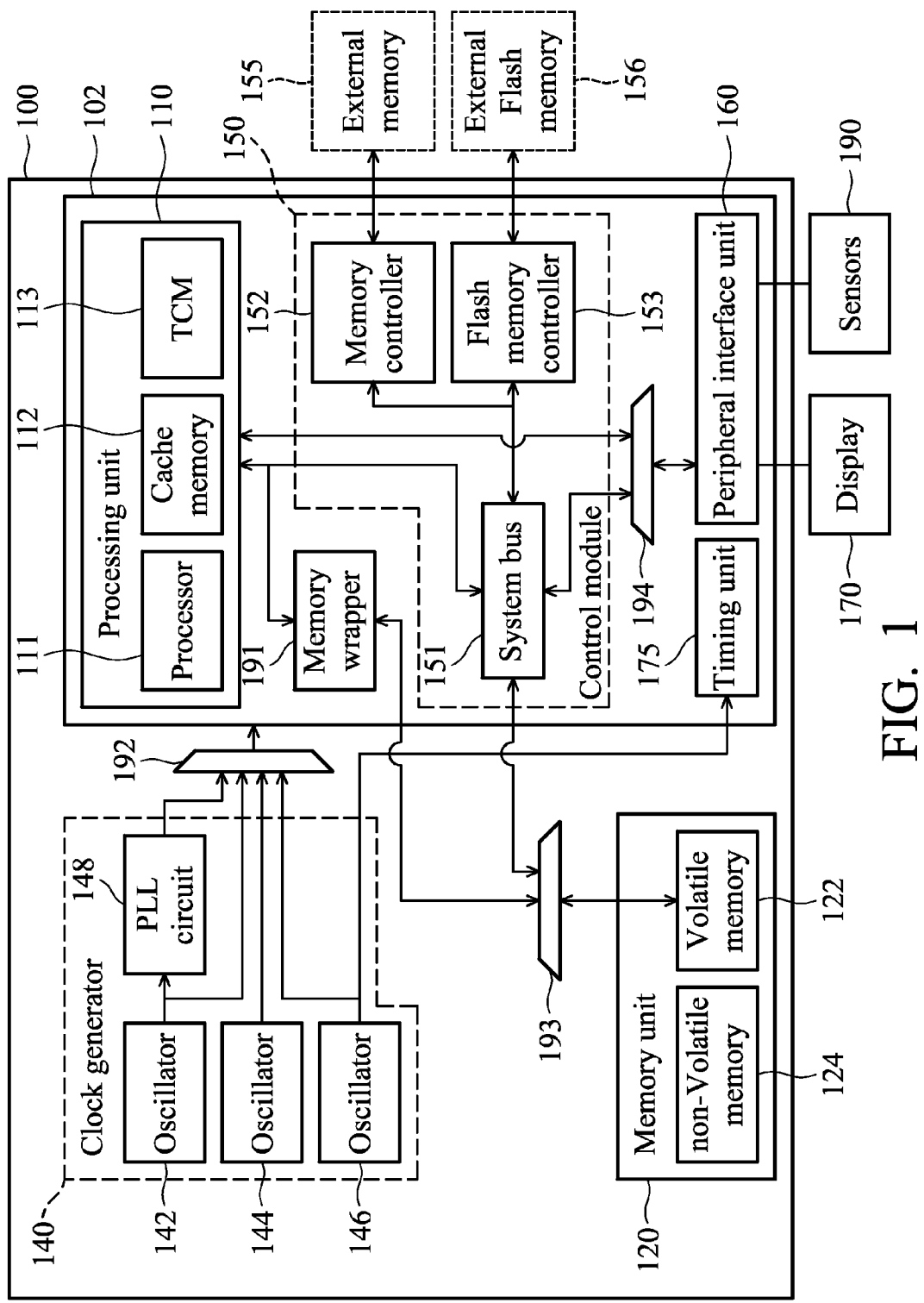
FIG. 1 is a block diagram illustrating a wearable device in accordance with one embodiment of the invention.

FIG. 1 is a block diagram illustrating a wearable device 100 in accordance with one embodiment of the invention. The wearable device 100 comprises a wearable controller 102, a memory unit 120, a clock generator 140, a display 170, and sensors 190. The wearable controller 102 comprises a processing unit 110, a control module 150, a timing unit 175, a peripheral interface unit 160 and a memory wrapper 191. For example, the wearable controller 102 may be fabricated as an integrated circuit (IC). The processing unit 110 comprises one or more processors (and/or microcontrollers (MCU)) 111, a cache memory 112, and a tightly-coupled memory (TCM) 113, wherein the cache memory 112 and the TCM 113 are dedicated memory units for the processor 111, and the TCM 113 has a lower access latency and lower power consumption than the cache memory 112. The memory unit 120 comprises a volatile memory (e.g. SRAM) 122 and a nonvolatile memory 124. In an embodiment, the volatile memory 122 may be an embedded memory which is integrated into the IC 102. The non-volatile memory 124 is capable of holding instructions and data without power and may store the software routines for controlling the wearable device 100 in the form of computer-readable program instructions. The non-volatile memory 124 may also contain a user interface application, which provides functionality for the portable device 10 and can output a graphical user interface on the display 170, which may be a touch-sensitive display (i.e. a "touch screen"). In an embodiment, the non-volatile memory 124 may be a flash memory or read-only memory (ROM), etc. The clock generator 140 may supply clock sources to components of the wearable device 100 based on the current operation mode of the wearable device 100. For example, the clock generator 140 may have a plurality of oscillators 142, 144, and 146 for generating a plurality of clock frequencies (e.g. 26 MHz, 32 KHz, etc.). In an embodiment, the oscillators 142, 144 and 146 may be silicon clock oscillators implemented using micro-electro-mechanical systems (MEMS) technology, quartz crystal oscillators, or RC oscillator circuits, etc. In one embodiment, the clock frequencies output from the oscillators 142 and 146 may be 26 MHz and 32 KHz, respectively. In addition, the clock frequency output from the PLL circuit 148 may be 200 MHz for example. In one embodiment, the oscillator 144 may be a low-power oscillator. When the wearable device 100 is in a "rich application" mode, the fastest clock frequency (e.g. 26 MHz) provided by the oscillator 142 may be selected, and the wearable device 100 may be set up as an "AP system". Alternatively, when the wearable device 100 is in a standby mode or a power saving mode, the power consumption of the wearable device 100 should be reduced as much as possible and thus the clock frequency from the low power oscillator 144, for example, will be selected. In the standby mode, the wearable device 100 may be arranged as an MCU system. The clock generator 140 may also include a phase-locked loop (PLL) circuit 148 for generating an output clock frequency from the oscillator 142. Generally, the clock signal output through the PLL circuit 148 has better accuracy than other clock signals directly generated by the oscillators, and the clock signal with higher accuracy is applied in the rich application mode.

As illustrated in FIG. 1, the control module 150 may include a system bus 151, a memory controller 152, and a flash memory controller 153. In one embodiment, an external memory (e.g. DRAM) 155 is coupled to the memory controller 152, and an external flash memory 156 can be connected to the flash memory controller 153. The system bus 151 may intercommunicate between the processing unit 110, the memory unit 120, the peripheral interface unit 160, the memory controller 152, and a flash memory controller 153. For example, the system bus may be compatible with a predefined data transmission protocol. The memory access command from the processor 111 to the memory unit 120, the external memory 155, or the external flash memory 156 may pass through the system bus 151. In addition, the control command from the processor 111 to the peripheral interface unit 160 may also pass through the system bus 151. For one having ordinary skill in the art, it is appreciated that the implementations of a system bus 151 and accessing external memories are well-known, and the details will be omitted here.

The peripheral interface unit 160 may include various peripheral interfaces such as the I2C interface, SPI interface, UART interface, and other interfaces such as display interfaces, audio interface, communications interfaces, an I/O interfaces etc. The user may connect different types of peripheral devices to the wearable device 100 via the compatible peripheral interface. For example, the sensors 190, which may include an accelerometer, a gyroscope, and a magnetometer, can be coupled to the processing unit 110 via the I2C, SPI, or UART interface of the peripheral interface unit 160. In one embodiment, the communications interfaces may include a Wifi, cellular, Bluetooth, and/or RFID transceiver for supporting communication with a wireless network. In one embodiment, the communications interfaces may also include other types of communications devices (not shown) besides wireless, such as serial communication via USB communication, for example. In one embodiment, the display 170 may be a touch screen. The display 170 may detect contact and any movement or break thereof using any of a plurality of touch sensitive technologies now known or later developed, including but not limited to capacitive, resistive, infrared, and surface acoustic wave technologies, as well as other proximity sensor arrays or other elements for determining one or more points of contact with the display 170. For one having ordinary skill in the art, it is appreciated that the implementations of the aforementioned peripheral interfaces are well-known, and thus the details will be omitted here. The control units 192~194 are configured to select between different data paths based on the current operation mode of the wearable device 100 (details will be described later).

The timing unit 175 may be applied as an internal timing device for the wearable device 100. The timing unit 175 may keep track of the time of day and makes this data available to the software routines executing in the processing unit 110. In this embodiment, the timing unit 175 is supplied with the clock signal having the lowest frequency (e.g. 32 KHz) and the timing unit 175 is always-on no matter the wearable device 100 is operated in the rich application mode or the standby mode. In one embodiment, the timing unit 175 can be referred to as a real-time clock (RTC).

In an embodiment, the wearable device 100 may further comprise a power module (not shown in FIG. 1). The power module is configured to power the various components of the wearable device 100. The power module may include a power management system, one or more power sources and any other components associated with the generation, management, and distribution of power in the wearable device 100.

In one embodiment, the sensors 190 may be integrated into a sub-system or a sensor hub having a local memory (e.g. SRAM), and the sub-system is coupled to the processing unit 110 through the system bus 151 in the control module 150.

In one embodiment, the wearable device 100 may be a smart watch or a smart wristband, and the wearable device 100 may further include a strap, a wristband, or a bracelet (not shown in FIG. 1). In one embodiment, the wearable device 100 may be a pair of smart glasses, and the wearable device 100 may further include a spectacle frame and optical lenses (not shown in FIG. 1). In one embodiment, the wearable device 100 may be an eyewear with a head-up display (HUD). It should be noted that the wearable device 100 may be in any form of wearable accessories, and the invention is not limited to the aforementioned wearable devices. For example, the wearable device 100 can be wearable on a user's wrist, upper arm, and/or leg, or may be attached to the user's clothing, and may have the functions of a wristwatch, a wearable display, a portable media player, and/or a mobile phone.

Figure 2:
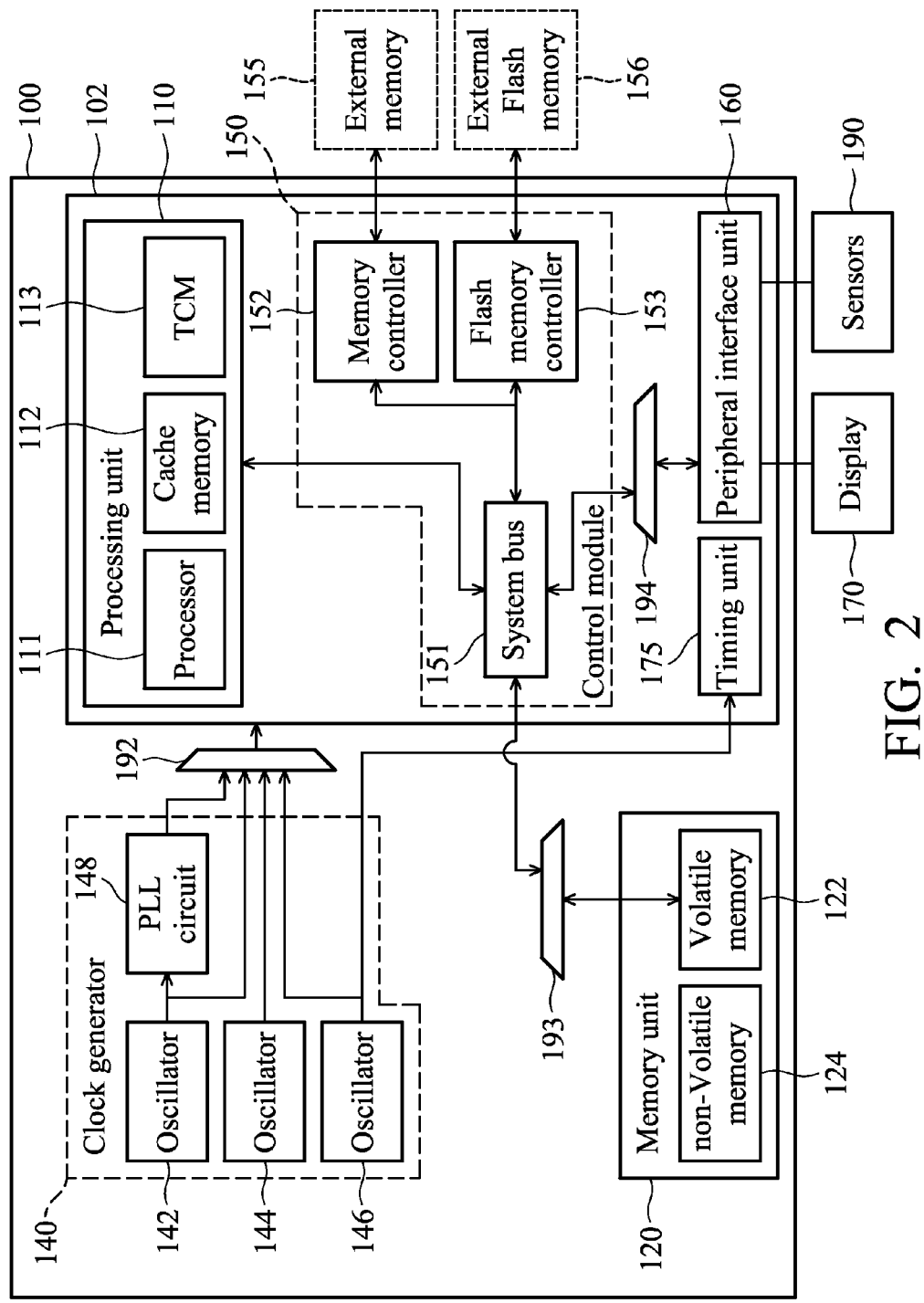
FIG. 2 is a block diagram of the wearable device in accordance with one embodiment of the invention.

FIG. 2 is a block diagram of the wearable device 100 operated in a first scenario in accordance with one embodiment of the invention. In the first scenario, taking the wearable device 100 equipped with the Android operating system as an example, when the user wants to play games or run applications on the wearable device 100, the processor 111 may set the wearable device 100 to enter a "rich application" mode. In the rich application mode, the processor 111 operates at full speed to handle frequent data processing of various applications, and the primary components (e.g. components 110~160) in the wearable device 100 are enabled and supplied with the clock signal having the highest frequency (e.g. 26 MHz) and accuracy (i.e. using the PLL circuit 148) provided by the clock generator 140. For description, the selected clock path and data paths are illustrated in FIG. 2 while the inactive or bypassed component (e.g. memory wrapper 191) are not shown. It should be noted that the local memory of the sub-system is not shared by the processor 111 in the rich application mode in the embodiment where the sensors 190 are integrated into a sub-system. The data paths from the processor 111 to the memory unit 120, external memory 155, or the external flash memory 156 can be established via the system bus 151. Accordingly, the power consumption of the wearable device 100 may inevitably remain at a relatively high level in the rich application mode due to high power consumption of the control module 150.

Figure 3:
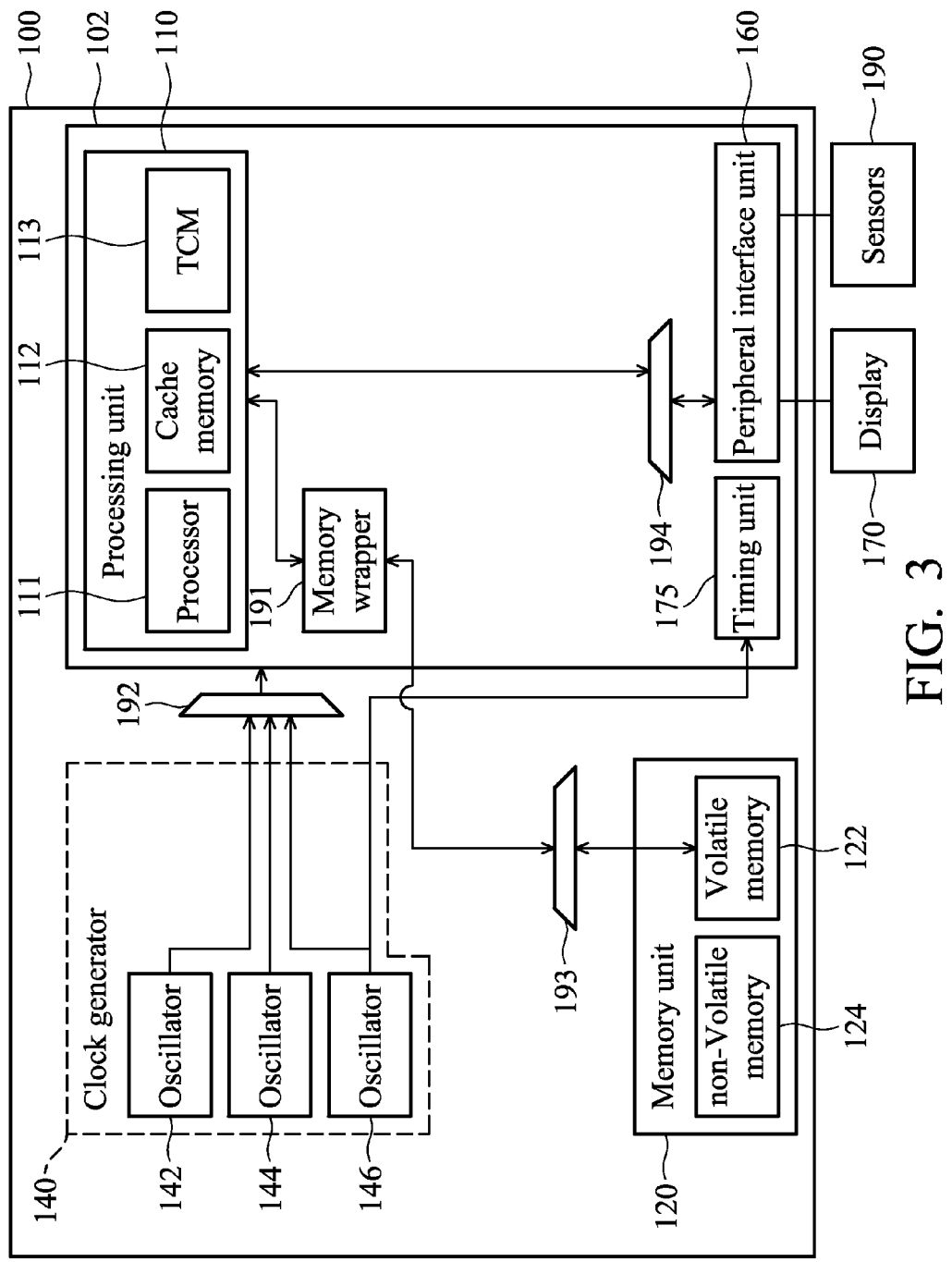
FIG. 3 is a block diagram of the wearable device in accordance with one embodiment of the invention.

FIG. 3 is a block diagram of the wearable device 100 in a second scenario in accordance with one embodiment of the invention. In the second scenario, the user does not execute applications or games on the wearable device 100, except one or more always-on applications, for most time of the day, and thus the wearable device 100 enters a standby mode to save power. For example, when the wearable device 100 is a smart watch, the wearable device 100 serves as an ordinary watch or be used to monitor the sports/fitness/medical conditions of the user, and thus some functions of the wearable device 100 should be always activated in the standby mode, such as watch updating and pedometer. For example, one of the microcontrollers associated with the watch updating and the sports/fitness/health monitoring functions in the processing unit 110 is active in the standby mode, so that the data reported from the timing unit 175 and the sensors 190 can be processed in the standby mode.

Referring to FIG. 3, the cache memory 112 can be reconfigured to a TCM memory for saving power in the standby mode. Meanwhile, the control units 192~194 may select the clock path and data paths associated with the standby mode, and the local memory of the sub-system is shared by the processing unit 110. For example, the PLL circuit 148 of the clock generator 140 is turned off in the standby mode, and the control unit 192 may select one of the candidate clock frequencies provided by the clock generator 140 in the standby mode. Preferably, the system bus 151 is inactive in the standby mode, and the external memory 155 and the external flash memory 156 are also inactive (e.g. may be disabled or in a data-retention/suspend mode). The control unit 193 may select the wrapper path rather than the system bus path in the standby mode. That is, the communication between the processing unit 110 and memory unit 120 can be established via the memory wrapper 191 without the system bus 151. For example, the memory wrapper 191 may be an interface capable of converting the memory interface of the memory unit 120 to a protocol interface used by the processing unit 110. In one embodiment, the memory wrapper 191 can be integrated into the processing unit 110. In one embodiment, the memory wrapper 191 may be a stand-alone circuit.

In one embodiment, one of the I2C, SPI and UART interfaces in the peripheral interface unit 160 is activated (i.e. depending on the interface of the sensors 190), and the remaining peripheral interfaces are disabled in the standby mode. The control unit 194 may select the direct data path between the processing unit 110 and the peripheral interface unit 160 without passing through the system bus 151, so that the processing unit 110 and activated interfaces of the peripheral interface unit 160 may communicate with each other directly without the system bus 151. In one embodiment, the display 170 may couple to the processing unit 110 through a sensor hub.

As described above, the wearable device 100 may be operated in two modes including the rich application mode and the standby mode. In one embodiment, the wearable device 100 may apply a same scalable operating system in the rich application mode and the standby mode. In another embodiment, the wearable device 100 may apply two different operating systems in the rich application mode and the standby mode, respectively. No matter which mode is selected, some components of the wearable device 100 are always activated (e.g. components associated with watch updating and sports/fitness/health monitoring functions). In one embodiment, the wearable device 100 may enter the standby mode by default. When the user wants to execute applications on the wearable device 100, the user may tap on a hardware button or a software button of the user interface displayed on the display 170 to toggle the operation mode of the wearable device 100 to the rich application mode.

It should be noted that when two different operating systems are used in the wearable device 100, the memory unit 120 or the local memory of the sub-system can be used to store intermediate data and settings of the operating systems. For example, a first operating system (or a micro-kernel) and a second operating system are used in the standby mode and the rich application mode, respectively. When the processing unit 110 is executing the first operating system and the wearable device 100 is to be switched to a second operating system, the processing unit 110 may store the required data and settings of the first operating system to the local memory of the sub-system or the memory unit 120 before flushing the cache memory 120 and TCM 130, loading the second operating system, and setting other components of the wearable device 100 to the rich application mode. For example, in one embodiment, the operations and control of the standby mode are relatively much simpler than those in the rich application mode, and the first operating system can be replaced by a micro-kernel (e.g. microcodes) for the standby mode, and the second operating system may be a real-time operating system. Alternatively, the operating system of the wearable device 100 may be a scalable operating system, which may fit different levels of data processing with different hardware configurations. In other words, the same scalable operating system can be applied in both the standby mode and the rich application mode.

Figure 4:
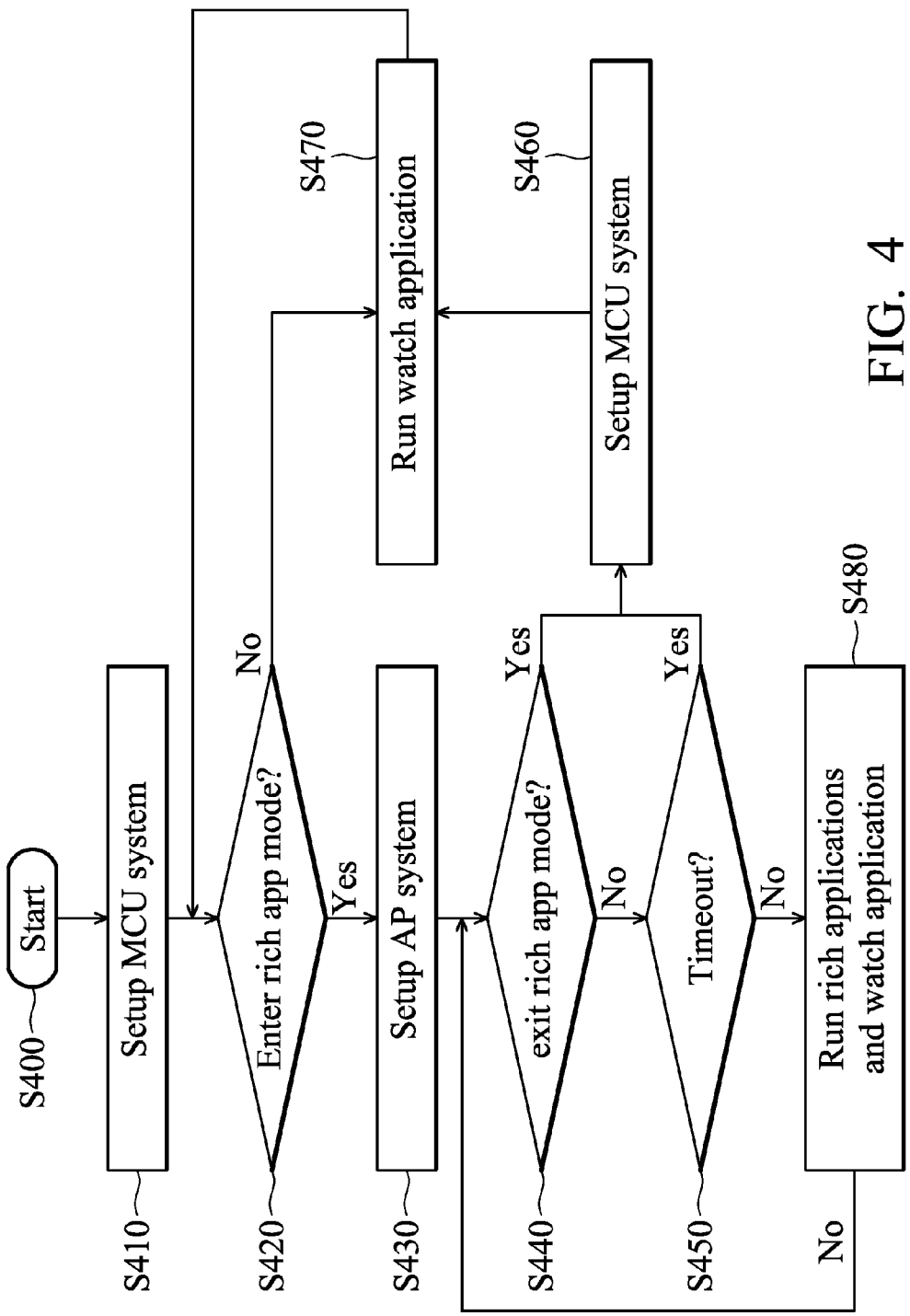
FIG. 4 is a flow chart illustrating a low-power method for a wearable device in accordance with one embodiment of the invention.

FIG. 4 is a flow chart illustrating the low-power control method for the wearable device 100 in accordance with one embodiment of the invention. The standby mode can be regarded as a default operation mode of the wearable device 100. For example, when the wearable device 100 boots up (step S400), the processing unit 110 may set up the corresponding components to enter the standby mode (i.e. setting up the MCU system) by default (step S410). The processing unit 110 determines whether the wearable device 100 should enter the rich application mode (step S420). For example, the processing unit 110 may detect the trigger signal from a software/hardware button or analyze the sensor data reported from one or more sensors of the sensors 190 to determine whether the wearable device 100 should enter the rich application mode. If so, the processing unit 110 sets up the corresponding components to enter the rich application mode (i.e. setting up the AP system) (step S430). Otherwise, the wearable device 100 may run the watch application (step S470).

When the wearable device 100 has entered the rich application mode, the processing unit 110 determines whether the wearable device 100 should exit the rich application mode (step S440). For example, when the wearable device 100 has entered the rich application mode, the user may manually tap on a software/hardware button on the wearable device 100 to generate a trigger signal, so that processing unit 110 may control the wearable device 100 to exit the rich application mode and go back to the standby mode. If there is no trigger signal detected, the processing unit 110 may further determine whether the wearable device 100 has been idle for a timeout period (e.g. 30 seconds) (step S450). If so, the processing unit 110 may control the wearable device 100 to exit the rich application mode and go back to the standby mode automatically (Yes in step S450). Otherwise (No in step S450), the processing unit 110 may run the rich application environment and execute the watch application and/or other applications. When the wearable device 100 goes back to the standby mode again, the processing unit 110 sets up the components for the standby mode again (i.e. turning off the components which are not required in the standby mode) (step S460). Afterwards, the processing unit 110 may execute the watch application (step S470).

In view of the above, a low-power control method for a wearable device 100 is provided. When the wearable device 100 enters a power saving mode or a standby mode, the power consuming components, including PLL circuit, system bus, unnecessary peripheral interfaces, external memories, etc. not required in the power saving mode are turned off, so that the power consumption of the wearable device 100 can be significantly reduced.

Moreover, a low-power wearable controller is provided. The wearable controller comprises a processing unit, a memory unit, a peripheral interface unit, and a control module. The control module, coupled to the processing unit, the peripheral interface unit and the memory unit, comprises a memory controller, a flash memory controller and a system bus. The control module is enabled in a first operation mode and the control module is disabled in a second operation mode.

While the invention has been described by way of example and in terms of the preferred embodiments, it is to be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A wearable controller, comprising:
   a processing module;
   a memory unit;
   a memory wrapper;
   a peripheral interface unit comprising a plurality of peripheral interfaces; and
   a control module, comprising a system bus intercommunicating between the processing module, the peripheral interface unit and the memory unit,
   wherein the wearable controller is operated in a first operation mode using a first operating system when the system bus of the control module is enabled and communication among the processing module, memory unit, and peripheral interface unit occurs through the system bus and not the memory wrapper, and
   wherein the wearable controller is operated in a second operation mode using a second operating system when the system bus of the control module is disabled, communication between the processing module and memory unit occurs through the memory wrapper and not the system bus, and the processing module is directly coupled to the peripheral interface unit.

2. The wearable controller as claimed in claim 1, wherein the control module comprises a memory controller and a flash memory controller capable of coupling to an external volatile memory and an external nonvolatile memory, respectively.

3. The wearable controller as claimed in claim 2, wherein the external volatile memory and the external nonvolatile memory are suspended in the second operation mode.

4. The wearable controller as claimed in claim 2, wherein the external volatile memory and the external nonvolatile memory are disabled in the second operation mode.

5. The wearable controller as claimed in claim 1, wherein the processing module comprises:
   at least one processor;
   a cache memory; and
   a first tightly-coupled memory,
   wherein when the wearable controller is switched to the second operation mode, the cache memory is reconfigured as a second tightly-coupled memory.

6. The wearable controller as claimed in claim 1, further comprising:
   a timing unit, for generating a real-time clock for providing time to the processing module.

7. The wearable controller as claimed in claim 6, wherein the processing module further executes a watch application based on the real-time clock provided by the timing unit in the first operation mode and the second operation mode.

8. The wearable controller as claimed in claim 1, further comprising:
   a clock generator, for providing a plurality of clock frequencies to components of the wearable controller,
   wherein when the wearable controller is in the first operation mode, the clock generator provides a first clock frequency of the plurality of clock frequencies to the processing module,
   wherein when the wearable controller is in the second operation mode, the clock generator provides a second clock frequency of the plurality of clock frequencies to the processing module,
   wherein the first clock frequency is higher than the second clock frequency.

9. The wearable controller as claimed in claim 8, wherein the first clock frequency is generated by a first oscillator and a phase-locked loop circuit, and the second clock frequency is generated by a second oscillator.

10. The wearable controller as claimed in claim 1, further comprising:
    a memory wrapper, coupled to the processing module and the memory unit.

11. The wearable controller as claimed in claim 1, wherein a first operating system is applied in the first operation mode, and a second operating system is applied in the second operation mode.

12. The wearable controller as claimed in claim 1, wherein the peripheral interface unit comprises an I2C, SPI, or UART interface for coupling to a plurality of sensors.

13. The wearable controller as claimed in claim 1, wherein the memory wrapper is an interface capable of converting a memory interface of the memory unit to a protocol interface used by the processing module, integrated directly into the processing module, or a stand-alone circuit.

14. A method for operating a wearable controller, wherein the wearable controller comprises a processing module, a memory unit, a control module, a memory wrapper, and a peripheral interface unit, and the control module comprises a system bus intercommunicating between the processing module, the memory unit and the peripheral interface unit, the method comprising:
    operating the wearable controller in a first operation mode using a first operating system when the system bus of the control module is enabled and communication among the processing module, memory unit, and peripheral interface unit occurs through the system bus and not the memory wrapper; and
    operating the wearable controller in a second operation mode using a second operating system when the system bus of the control module is disabled, communication between the processing module and memory unit occurs through the memory wrapper and not the system bus, and the processing module is directly coupled to the peripheral interface unit.

15. The method as claimed in claim 14, wherein the control module comprises a memory controller and a flash memory controller capable of coupling to an external volatile memory and an external nonvolatile memory, respectively.

16. The method as claimed in claim 15, wherein the external volatile memory and the external nonvolatile memory are disabled in the second operation mode.

17. The method as claimed in claim 14, wherein the processing module comprises at least one processor, a cache memory, and a first tightly-coupled memory, and the method further comprises:
    reconfiguring the cache memory as a second tightly-coupled memory when the wearable controller is switched to the second operation mode.

18. The method as claimed in claim 14, wherein the wearable controller further comprises a timing unit for generating a real-time clock for the wearable controller and providing time to the processing module.

19. The method as claimed in claim 18, further comprising:

executing a watch application by the processing module based on the real-time clock provided by the timing unit in the first operation mode and the second operation mode.

20. The method as claimed in claim 14, further comprising:
   providing a first clock frequency in the first operation mode; and
   providing a second clock frequency in the second operation mode,
   wherein the first clock frequency is higher than the second clock frequency.

21. The method as claimed in claim 14, wherein a first operating system is applied in the first operation mode, and a second operating system is applied in the second operation mode.

22. The method as claimed in claim 21, wherein the first operating system is a real-time operating system, and the second operating system is a micro-kernel.

23. The method as claimed in claim 14, wherein the memory wrapper is an interface capable of converting a memory interface of the memory unit to a protocol interface used by the processing module, integrated directly into the processing module, or a stand-alone circuit.

\* \* \* \* \*